United States Patent
Puri et al.

[19]

[11] Patent Number: 6,094,916

[45] Date of Patent: Aug. 1, 2000

[54] DRY LOW OXIDES OF NITROGEN LEAN PREMIX MODULE FOR INDUSTRIAL GAS TURBINE ENGINES

[75] Inventors: Rahul Puri; Mohan K. Razdan, both of Indianapolis; Duane A. Smith, Carmel; David M. Stansel, Indianapolis, all of Ind.

[73] Assignee: Allison Engine Company, Indianapolis, Ind.

[21] Appl. No.: 09/111,893

[22] Filed: Jul. 8, 1998

Related U.S. Application Data

[63] Continuation of application No. 08/464,526, Jun. 5, 1995, abandoned.

[51] Int. Cl.⁷ .................. F23R 3/14; F23R 3/44; F23R 3/46
[52] U.S. Cl. .................. 60/737; 60/747; 60/748; 60/39.37
[58] Field of Search .................. 60/737, 738, 739, 60/740, 746, 747, 748, 39.37; 431/8, 9

[56] References Cited

U.S. PATENT DOCUMENTS

| | | | |
|---|---|---|---|
| 3,121,996 | 2/1964 | Smith | 60/748 |
| 3,605,405 | 9/1971 | DuBell et al. | 60/748 |
| 3,748,853 | 7/1973 | Jones et al. | |
| 4,008,039 | 2/1977 | Compton et al. | |
| 4,073,134 | 2/1978 | Koch | 60/748 |
| 4,222,232 | 9/1980 | Robinson | |
| 4,265,085 | 5/1981 | Fox et al. | |
| 4,301,657 | 11/1981 | Penny | 60/748 |
| 4,356,698 | 11/1982 | Chamberlain | 60/737 |
| 4,589,260 | 5/1986 | Krockow | 60/737 |
| 4,598,553 | 7/1986 | Saito et al. | 60/748 |
| 4,671,069 | 6/1987 | Sato et al. | |
| 4,746,859 | 5/1988 | Malik | |
| 4,802,334 | 2/1989 | Eder et al. | |
| 4,898,001 | 2/1990 | Kuroda et al. | |

(List continued on next page.)

FOREIGN PATENT DOCUMENTS

| | | | |
|---|---|---|---|
| 3819898 | 12/1989 | Germany | 60/737 |
| 60332 | 5/1977 | Japan | 60/737 |
| 4-148113 | 5/1992 | Japan | 431/9 |
| 4-96759 | 12/1993 | Japan. | |
| 6-257747 | 9/1994 | Japan. | |
| 2073399 | 10/1981 | United Kingdom | 60/737 |

OTHER PUBLICATIONS

T. Sattelmayer, M.P. Felchlin, J. Haumann, J. Hellat & D. Styner; "Second–Generation Low–Emission Combustors for ABB Gas Turbines: Burner Development and Tests at Atmospheric Pressure;" *Journal of Engineering for Gas Turbines and Power*; Jan. 1992, vol. 114, 118–125.

*Primary Examiner*—Ted Kim
*Attorney, Agent, or Firm*—Woodard, Emhardt, Naughton, Moriarty & McNett, Patent and Trademark Attorneys

[57] ABSTRACT

The present invention relates generally to a lean premix module for an industrial gas turbine engine to satisfy increasingly stringent environmental requirements. A combustion system of the present invention employs a lean premix technique to meet the engine operability requirements and high power emission targets without the use of combustor diluent injection or post combustor exhaust treatment. A lean premix combustion mode is utilized to minimize primary zone combustion temperatures and limit the oxides of nitrogen production during high power engine operation. In one form of the present invention, the lean premix combustion is carried out in an off centerline silo combustor having a plurality of lean premix modules positioned parallel within a common liner. The lean premix modules receive the air from the compressor into a radial swirler and the fuel is dispensed along the radial swirler in order to be premixed with the air. A nozzle having a converging-diverging section is utilized to accelerate the fluid flow in the converging portion to prevent flashback, and in the diverging portion to expand the fluid flow to induce a centrally located recirculation zone. In another form of the present invention, the lean premix module is located inline in a can-annular combustion system.

37 Claims, 11 Drawing Sheets

U.S. PATENT DOCUMENTS

| | | |
|---|---|---|
| 4,967,561 | 11/1990 | Bruhwiler et al. ......................... 60/737 |
| 4,984,429 | 1/1991 | Waslo et al. . |
| 5,016,443 | 5/1991 | Shimizu et al. . |
| 5,038,558 | 8/1991 | Sohma et al. . |
| 5,081,844 | 1/1992 | Keller et al. ............................ 60/39.37 |
| 5,085,038 | 2/1992 | Todman et al. ......................... 60/39.37 |
| 5,127,221 | 7/1992 | Beebe . |
| 5,164,668 | 11/1992 | Alfors . |
| 5,165,241 | 11/1992 | Joshi et al. . |
| 5,218,824 | 6/1993 | Cederwall et al. . |
| 5,251,447 | 10/1993 | Joshi et al. . |
| 5,259,184 | 11/1993 | Borkowicz et al. . |
| 5,261,239 | 11/1993 | Barbier et al. . |
| 5,263,325 | 11/1993 | McVey et al. . |
| 5,274,991 | 1/1994 | Fitts ....................................... 60/39.37 |
| 5,274,993 | 1/1994 | Keller ..................................... 60/39.37 |
| 5,289,686 | 3/1994 | Razdan et al. . |
| 5,295,352 | 3/1994 | Beebe et al. . |
| 5,297,390 | 3/1994 | Sood . |
| 5,309,709 | 5/1994 | Cederwall et al. . |
| 5,319,923 | 6/1994 | Leonard et al. . |
| 5,319,935 | 6/1994 | Toon et al. ............................... 60/737 |
| 5,321,947 | 6/1994 | Sood et al. . |
| 5,327,727 | 7/1994 | Ward . |
| 5,331,805 | 7/1994 | Myers et al. . |
| 5,339,635 | 8/1994 | Iwai et al. . |
| 5,345,768 | 9/1994 | Washam et al. . |
| 5,361,576 | 11/1994 | Muller . |
| 5,408,825 | 4/1995 | Foss et al. ............................... 60/737 |
| 5,412,938 | 5/1995 | Keller . |
| 5,417,070 | 5/1995 | Richardson ............................. 60/748 |
| 5,450,724 | 9/1995 | Kesseli et al. ........................... 60/748 |
| 5,450,725 | 9/1995 | Takahara et al. ........................ 60/737 |
| 5,640,851 | 6/1997 | Toon et al. ............................... 60/737 |
| 5,680,753 | 10/1997 | Hollinger et al. ....................... 60/747 |

DRY LOW OXIDES OF NITROGEN LEAN PREMIX MODULE FOR INDUSTRIAL GAS TURBINE ENGINES

This application is a continuation application of Ser. No. 08/464,526, filed Jun. 5, 1995, now abandoned.

BACKGROUND OF THE INVENTION

The present invention relates generally to gas turbine engine combustors, and more particularly in one form of the present invention to a lean premix module which significantly reduces emissions of oxides of nitrogen while maintaining low emission levels of unburned hydrocarbons and carbon monoxide.

Air polluting emissions are an undesirable by-product from the operation of a gas turbine engine that burns fossil fuels. The primary air polluting emissions produced by the burning of fossil fuels include carbon dioxide, water vapor, oxides of nitrogen, carbon monoxide, unburned hydrocarbons, oxides of sulfur and particulates. Of the above emissions, carbon dioxide and water vapor are generally not considered objectionable. However, air pollution has become a worldwide concern and many countries have enacted stricter laws restricting the discharge of the pollutants from a gas turbine engine.

Gas turbine engine designers generally accept that many of the by-products of the combustion of a fossil fuel can be controlled by design modifications, cleanup of exhaust gases and/or regulating the quality of fuel. For example, the emission of particulates in exhaust gas have been controlled by design modifications to the combustors and fuel injectors, or by removing the particulates with traps and filters. The selection of fuels that are low in total sulfur content is a generally accepted method to control the discharge of sulfur oxides. Therefore the remaining polluting emissions of primary concern in the exhaust gases are oxides of nitrogen and unburned hydrocarbons.

The principal mechanism for the formation of oxides of nitrogen involves the direct oxidation of nitrogen and oxygen, and the chemical reaction producing this by-product occurs at a rate that is an exponential function of temperature. It is well known that in a gas turbine engine the oxidation of nitrogen is dependent upon the temperature in the primary combustion zone. Consequently, a small reduction in temperature within the combustor can result in a relatively large reduction in the emission of oxides of nitrogen. Further, in the traditional combustor, regions exist in the primary combustion zone that have stoichiometric mixtures with attendant high gas temperatures that enhance stability and combustion efficiency at the expense of oxides of nitrogen, carbon monoxide and unburned hydrocarbons production.

Until recently, a common technique for reducing the emission of oxides of nitrogen from a gas turbine engine involved reducing the flame temperature in the primary combustion zone of the combustor, such as through diluent injection which involves injecting large amounts of water or steam directly into the primary combustion zone. Diluent injection reduces the high temperatures that are produced in the stoichiometric regions of the current diffusion flame type combustors and the reduced temperatures reduce the formation of oxides of nitrogen. Unfortunately the lower temperatures slow the oxidation processes that are responsible for destroying unburned hydrocarbons and carbon monoxide thereby increasing their emission levels. Further, diluent injection also negatively impacts combustor and turbine durability and a fuel consumption penalty is incurred.

While diluent injection has been utilized to reduce the formation of oxides of nitrogen, a second technique selective catalytic reduction has been utilized to convert the oxides of nitrogen into nitrogen gas after it is formed. Both of these prior techniques have the disadvantages of added complexity, high installation costs, high operating costs and reduced engine reliability.

Most recently, gas turbine engine designers and manufacturers have generally adopted a lean premix combustion technique to reduce the pollutant emissions from the engine by altering the basic combustion process where the pollutants are formed, thereby making the combustion process inherently clean. In lean premix combustion the fuel and air are premixed to a fuel lean proportion prior to combustion. The premixing of the fuel and air in this fashion avoids the high temperature stoichiometric fuel air mixtures which yields the corresponding highest flame temperatures, and therefore the formation rate of oxides of nitrogen, which is exponentially dependent, on temperature is lowered.

Although the prior techniques for reducing the emissions of oxides of nitrogen from gas turbine engines are steps in the right direction, the need for additional improvements still remain. The present invention satisfies this need in a novel and unobvious way.

SUMMARY OF THE INVENTION

One form of the present invention contemplates a combination, comprising: a gas turbine engine; a silo combustor connected to the gas turbine engine, the silo combustor being connected to the gas turbine engine off the centerline of the gas turbine engine, and the combustor having a dome; and a plurality of lean premix modules positioned within the dome of the silo combustor, each of the lean premix modules comprising: a fixed radial swirler; a plurality of fuel passages positioned axially along the radial swirler for dispensing fuel to be mixed with a flow of air passing through the swirler; and a nozzle in fluid communication with the swirler, the nozzle having a converging portion for accelerating the flow of mixed fuel and air to prevent flashback into the lean premix module, and the nozzle having a diverging portion connected downstream from the converging portion for expanding the flow of fuel and air and inducing a centrally located recirculation zone.

One object of the present invention is to provide an improved combustor for a gas turbine engine.

Related objects and advantages of the present invention will be apparent from the following description.

DESCRIPTION OF THE PREFERRED EMBODIMENT

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 1:
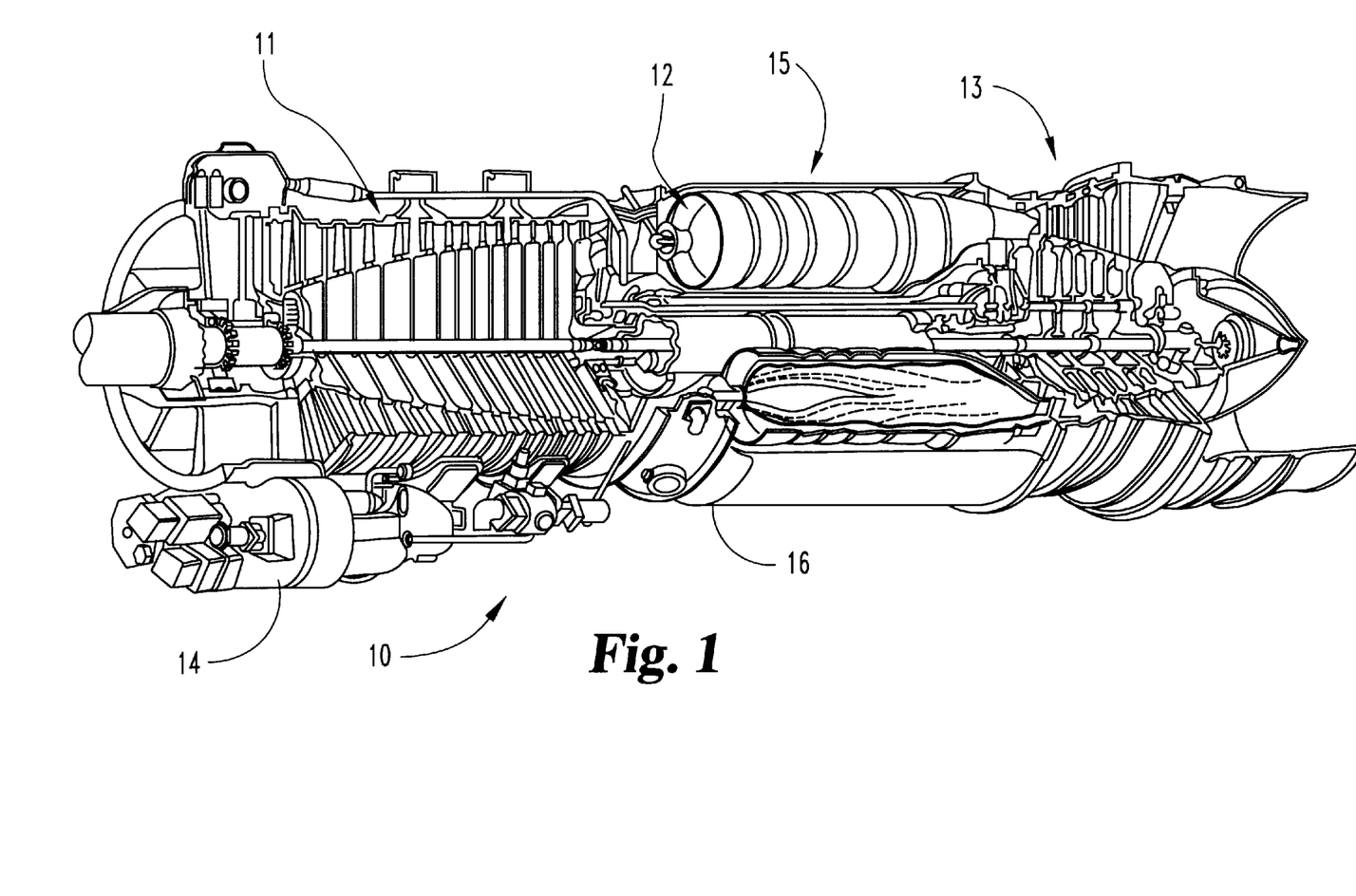
FIG. 1 is a partially fragmented side elevational view of an industrial gas turbine engine including a combustor comprising one form of the present invention.

Referring to FIG. 1, there is illustrated a natural gas fueled industrial gas turbine engine 10. The industrial gas turbine engine illustrated in FIG. 1 is a single shaft model 501-K which is manufactured by Allison Engine Company of Indianapolis, Ind. It is understood that other gas turbine engines could typically utilize at least one form of the the present invention. An industrial gas turbine engine 10 generally integrates a compressor 11, a combustor 12 and a power turbine 13. It is important to realize that there are a multitude of ways in which the components can be linked together. Additional compressors and turbines could be added with intercoolers connecting between the compressors and reheat combustion chambers could be added between the turbines.

In one form of the present invention a combustion system 15 comprises six can type combustion liners 12 that are located in an annulus 16 formed by an outer and inner engine casing. It is understood that other inline combustion systems having a different quantity of can type liners are contemplated by this form of the present invention. Industrial gas turbine engines are used for electric power generation including stand by, continuous, and co-generation applications on land based, oil drilling rigs and ship board installations. Further, industrial gas turbine engines historically have been used to drive compressors in oil and gas recovery, and pipe line service systems as well as providing propulsion power for hydrofoil and conventional vessels.

Figure 2:
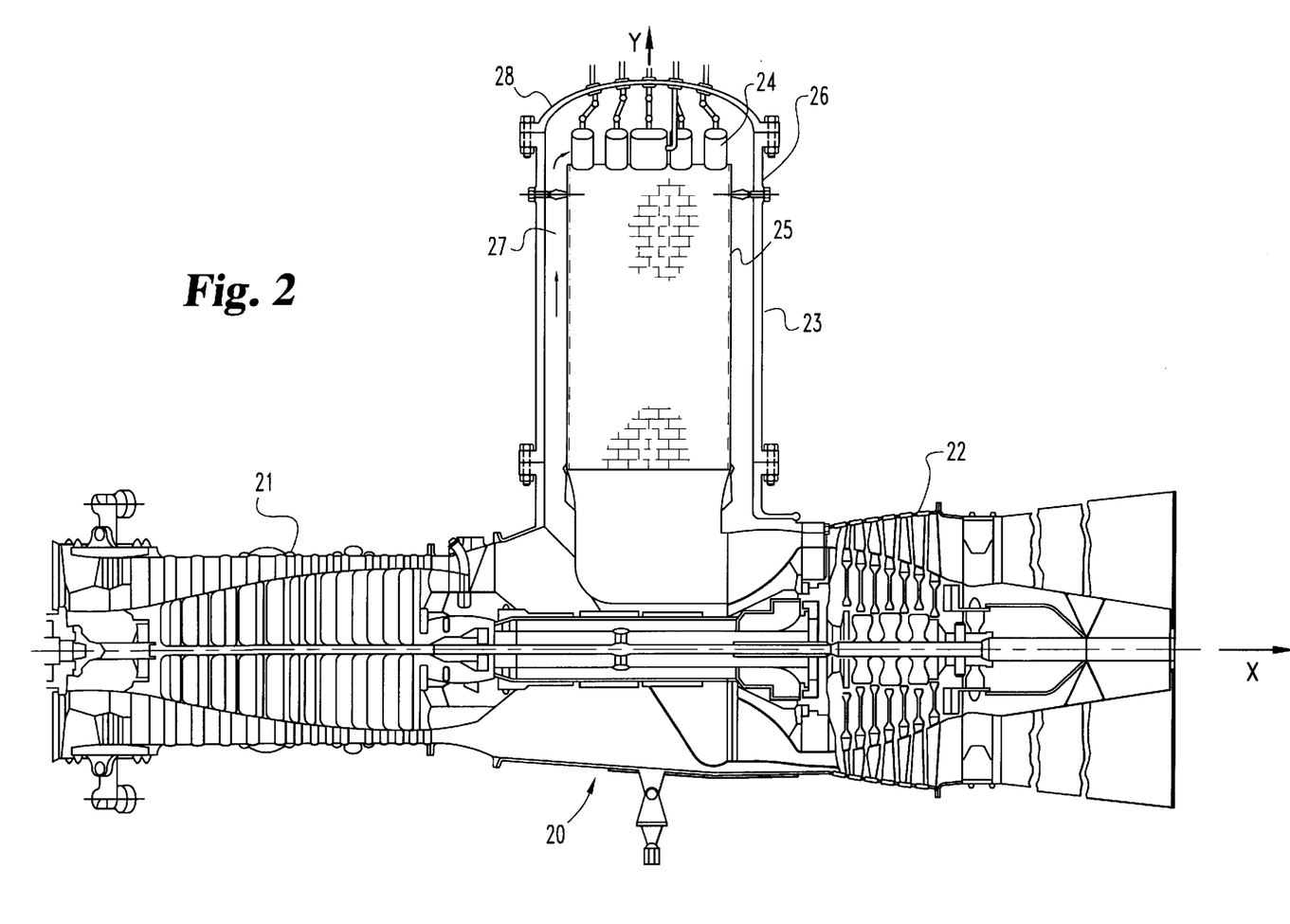
FIG. 2 is an illustrative side elevational view of an industrial gas turbine engine including an external combustion system comprising one form of the present invention.

With reference to FIG. 2, there is illustrated a side elevational view of an industrial gas turbine engine 20 which integrates a compressor 21, a turbine 22 and a premix combustor 23. In one form of the gas turbine engine 20 the silo combustor 23 is located off the centerline X of the engine, and the centerline Y of the combustor 23 is orthogonal to the centerline X of the compressor 21 and turbine 22. An off centerline silo combustor system allows for the size or volume of the combustor to be increased because there is no constraint on maintaining the combustor in the physical space between the compressor and the turbine. Additional combustor volume is advantageous for reducing carbon monoxide and unburned hydrocarbon emissions in premixed combustor systems.

Figure 3:
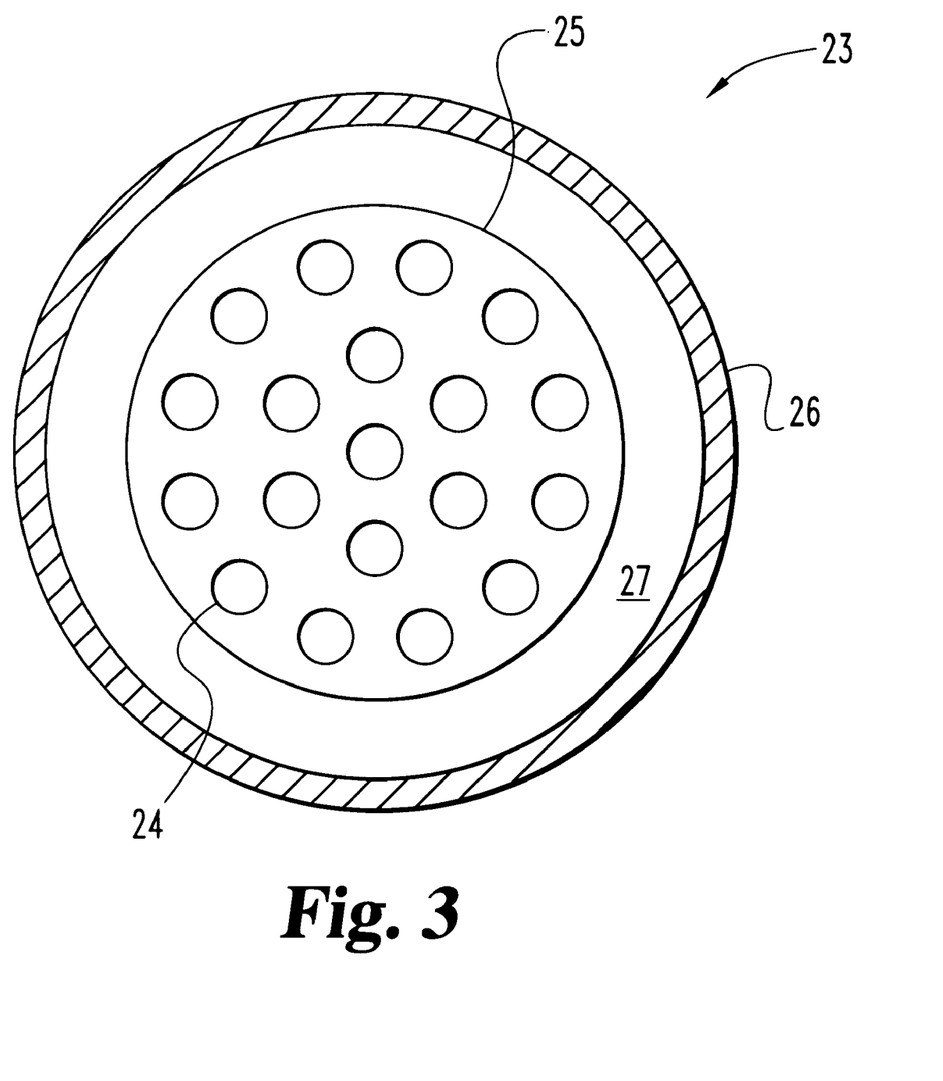
FIG. 3 is an illustrative end view of the lean premix modules comprising a portion of the FIG. 2 external combustion system.

The schematic in FIG. 2 presents a gas turbine engine, model 501-K that is manufactured by Allison Engine Company, with an attached silo combustion system. The silo combustion system includes a plurality of lean premix modules 24. It is preferred that the number of lean premix modules located within the silo combustion system be within the range of about seven to 25, and it is most preferred that there are nineteen lean premix modules (FIG. 3) located within a single combustion liner 25. The interaction between the plurality of lean premix modules 24 reduces the recirculation zone associated with each module thereby reducing the formation of oxides of nitrogen. Further, in another form of combustor 23 a catalytic reduction stage is added to convert oxides of nitrogen to nitrogen gas and ultimately lower the engine emissions.

In the preferred form of combustor 23 the lean premix modules 24 are closely packed into the dome 28 of the combustor, and this arrangement is generally referred to as parallel staging. The term dome as used herein is employed to define a chamber of any shape notwithstanding that dome is used in some other contexts to be limited to a hemispherical shape. All of the modules 24 receive a substantially similar volume of air at their inlet, while the number of modules supplied with fuel is governed by power requirements. The plurality of modules 24 are supplied with fuel in stages, that comprise several modules each in order to minimize the complexity of the fuel distribution network. In the preferred form of combustor 23 the modules 24 are arranged in six stages with four modules in the first stage and three modules in each of the next five stages. In an alternative form of the combustor 23 the modules 24 are not in a staged mode. Further, it is contemplated in the present invention that the modules 24 are arranged in a series staging mode. Series staging involves spreading the modules out axially within the length of the single combustor liner.

In gas turbine engine 20 the air from compressor 21 is directed through a passageway to the combustor 23, such that it can be discharged between a combustor liner 25 and a combustor case 26. The air travels through an annular passageway 27 to the dome 28 of the combustor, and the flow of air is turned a maximum of 180 degrees before entering the combustion chamber.

Figure 4:
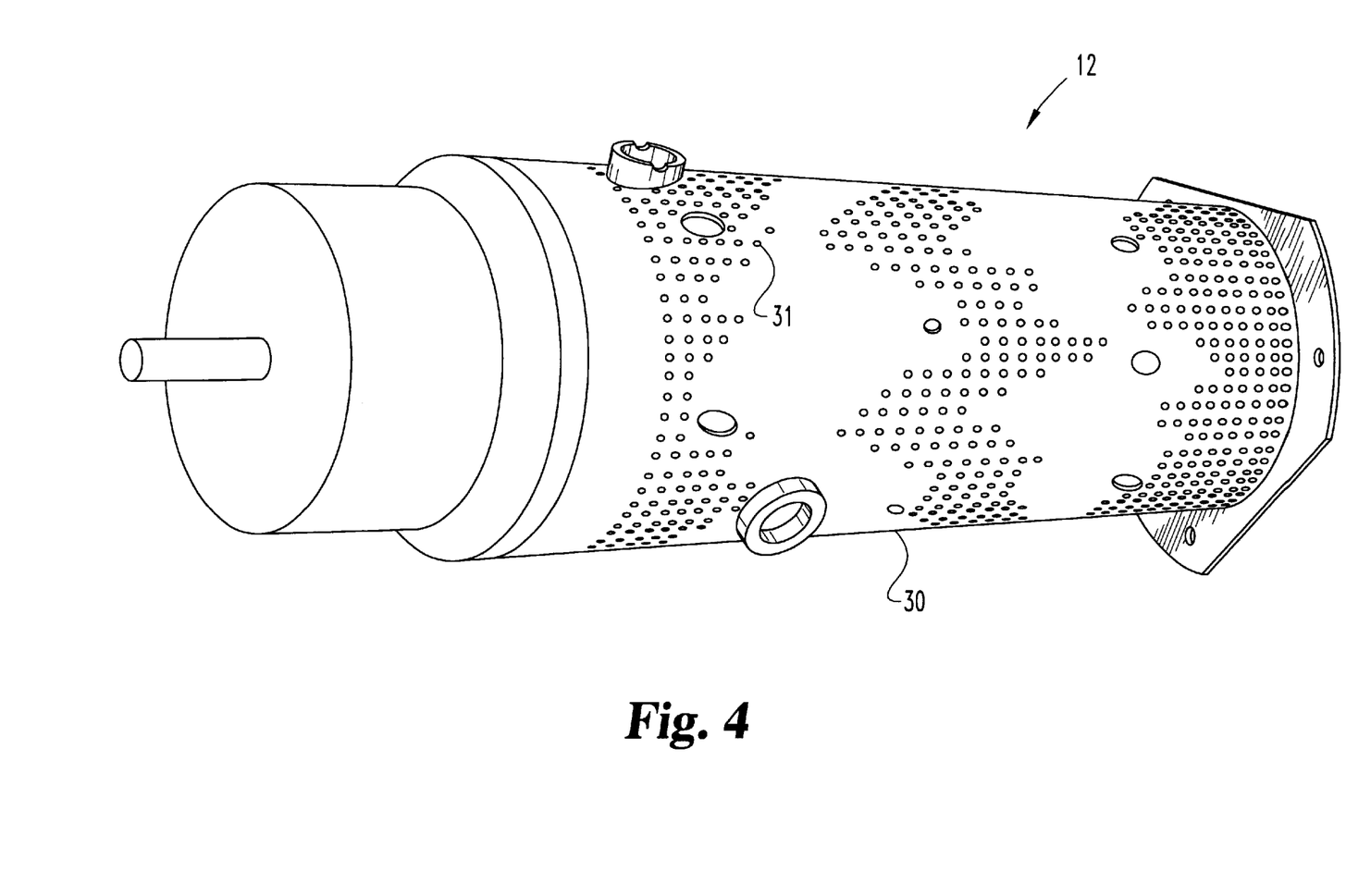
FIG. 4 is a perspective view of one form of the FIG. 1 combustor.

Referring to FIG. 4, there is illustrated a perspective view of one form of the inline combustor 12 with a lean premix module connected at the upstream end of the combustor. Several forms of lean premix modules will be described hereinafter and they are connectable to the combustor 12. The substantially cylindrical liner wall 30 of the combustion liner barrel 25 is cooled using either a backside convection cooling or effusion cooling. Both of these designs are generally well known to people skilled in the art and U.S. Pat. No. 5,289,686 to Razdan provides added details thereon, and is incorporated herein by reference. The effusion cooled design includes providing several thousand small diameter holes 31 that are laser drilled at an acute angle with respect to the wall 30. In the preferred embodiment of cylindrical liner 30 the holes 31 are formed at an angle of 20 degrees with respect to the liner wall 30. The effusion hole pattern is optimized to produce uniform wall temperatures consistent with the design requirements for this liner. Further, the inside surface of the combustion liner is coated with a thermal barrier ceramic coating. It is understood that other forms of the present invention utilize backside convention cooling, and that the combustion liner can be utilized without a thermal barrier ceramic coating.

Figure 5:
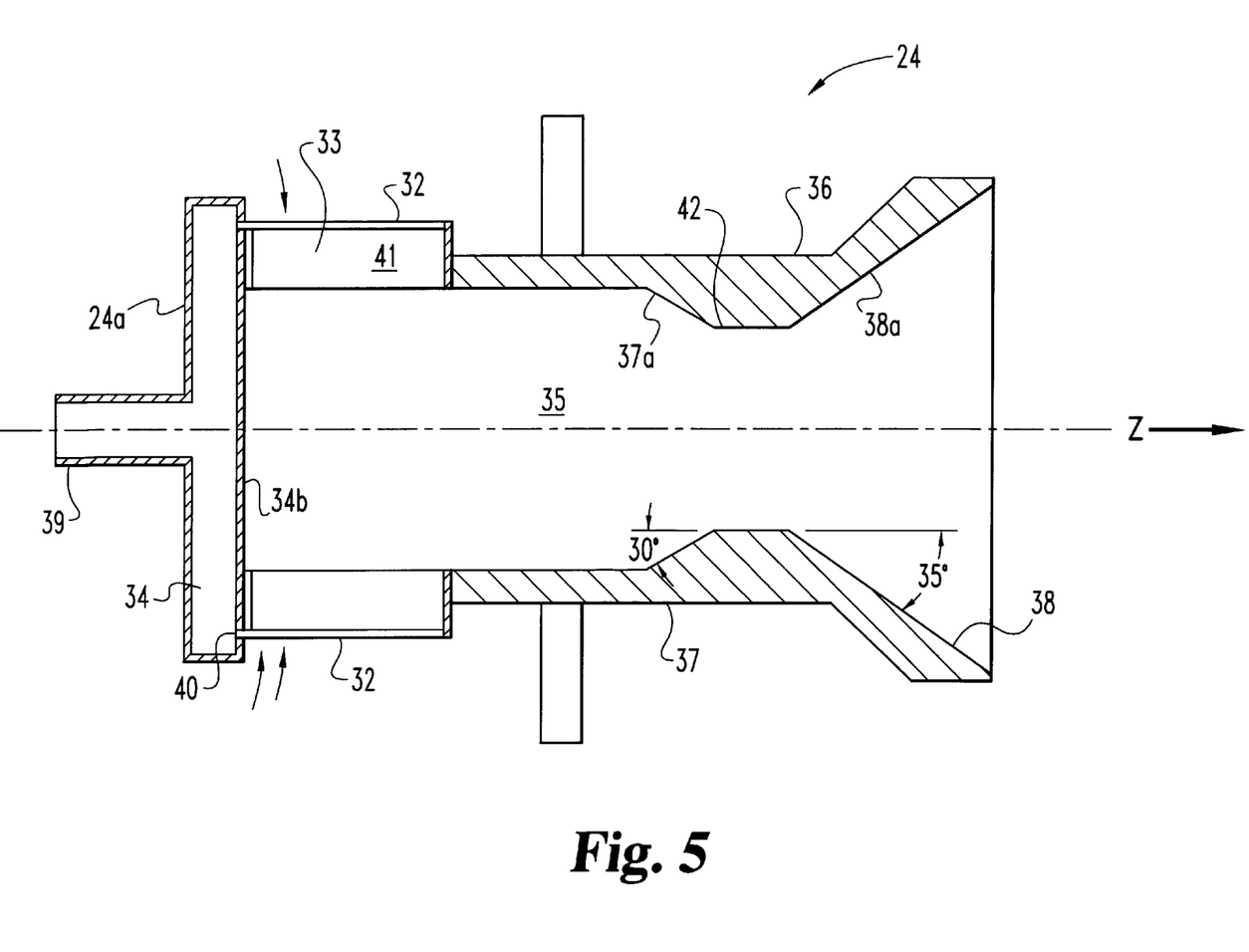
FIG. 5 is an illustrative side view of one form of the lean premix module comprising a portion of the FIG. 2 external combustion system.

With reference to FIG. 5, there is illustrated an enlarged side elevational view of the lean premix module 24. The premix module 24 is utilized to mix the fuel and air prior to delivery into a primary combustion zone within the combustion liner 25. In the preferred embodiment the fuel is natural gas. The lean premix module 24 includes a plurality of fuel tubes 32, a fixed radial inflow swirler 33, a fuel manifold 34, a premixing chamber 35 and a nozzle 36. The nozzle 36 refers to the converging-diverging section of the module. Converging section 37 accelerates the flow of air and fuel to prevent a flame from within the primary combustion zone from flashing back into the premixing chamber 35. In the preferred embodiment the converging section 37 includes an included angle of 60 degrees. It is preferred that the fluid flow be accelerated to a rate of about 250 ft/sec. Diverging section 38, which is separated from the converging section 37 by a throat 42, gradually expands and reduces the speed of the fuel and air mixture and induces a centrally located recirculation zone without the aid of a centerbody. It is desirable to produce a single central recirculation zone at the exit of the lean premixing module. The diverging section 38 has an included angle of about 70 degrees. Each of converging section 37 and diverging section 38 define a frustoconical surface 37a and 38a respectively. The central recirculation zone is located downstream from the diverging section 38 of nozzle 36.

Figure 7:
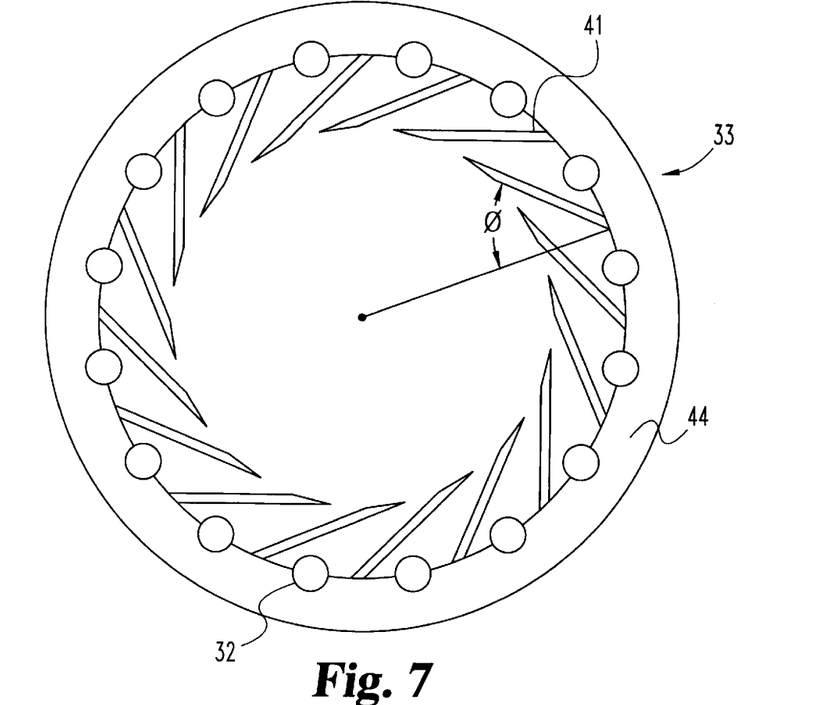
FIG. 7 is an end view of one form of the radial swirler with fuel tubes comprising a portion of the lean premix module of FIG. 5.

The fuel manifold 34 is located on the upstream end 24a of the module 24, and is connected to an external fuel source (not illustrated) though a fueling tube 39. Fuel manifold 34 has a plurality of apertures 40 formed in its downstream end 34b that are in fluid communication with the fuel tubes 32. The radial swirler 33 is fixidly attached to the module 24, and includes a plurality of flat swirler vanes 41 that extend parallel to the longitudinal centerline Z. As seen in FIG. 7, the flat swirler vanes 41 are angled toward the longitudinal centerline such that the inner edges form a restriction between adjacent vanes and a hollow core in the center of the swirler 33. The premixing chamber 35 being of a sufficient size and/or volume so as to not inhibit premixing, and in the preferred form defining a substantially cylindrical shape. In the preferred embodiment the premixing chamber 35 and the nozzle 36 comprise an integral piece formed of a nickel alloy. A most preferred material is marketed by International Nickel Company of Huntington, W.Va. under the name HASTELLOY X ALLOY. Other materials having similar properties are contemplated by the present invention.

Figure 6:
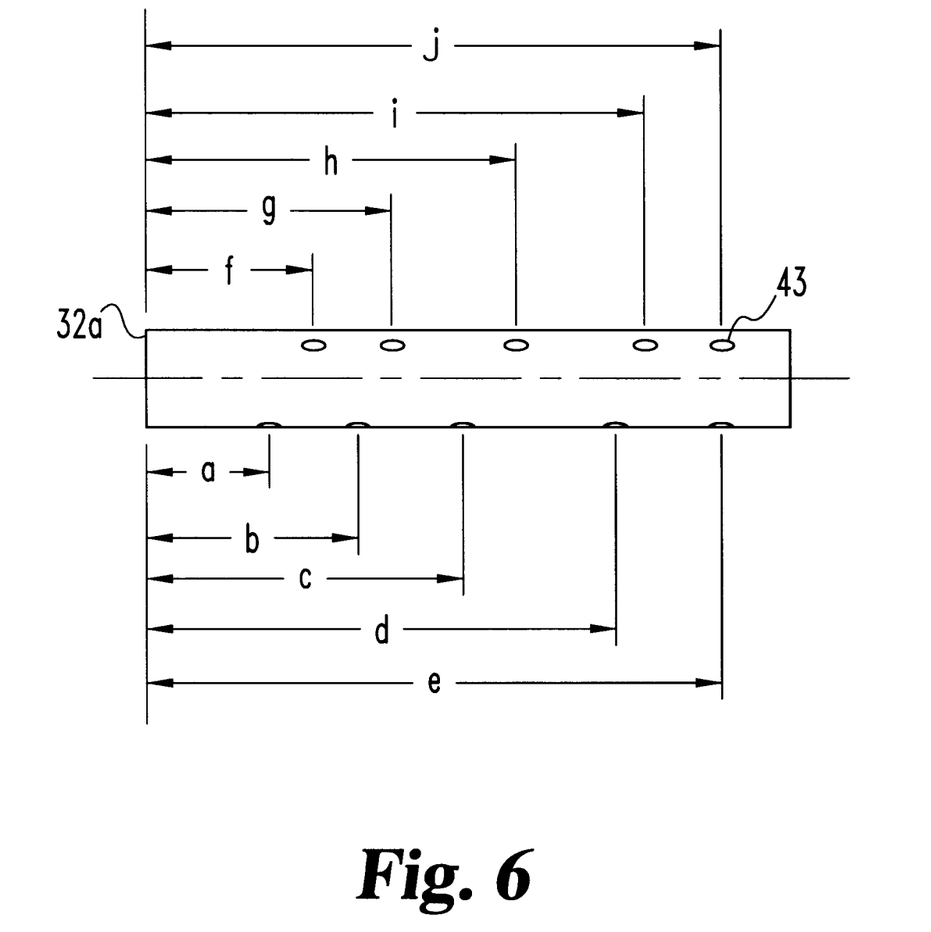
FIG. 6 is a side elevational view of one form of the fuel tube comprising a portion of the lean premix module of FIG. 5.
Figure 8:
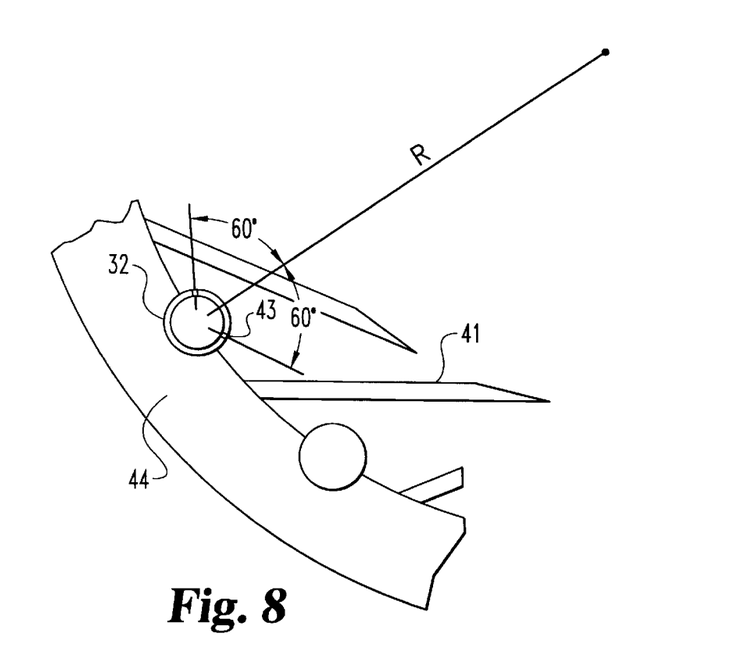
FIG. 8 is a partial end view of the radial swirler of FIG. 7.

With reference to FIGS. 6–8, there is illustrated further detail regarding the components that form the premix module 24. The fuel tubes 32 are located between the vanes, and in the preferred embodiment the tubes having an outside diameter of 3/16 inches and include ten axially spaced 0.023 inch diameter fuel dispensing holes 43 therein. In alternate forms of the present invention the fuel tubes have between 5 and 20 fuel dispensing holes for injecting the fuel into the incoming air stream that passes from the compressor. The fuel is dispensed from the fuel dispensing holes 43 such that it does not have sufficient momentum to penetrate the cross flow of air.

With particular reference to FIG. 6 there is illustrated a preferred embodiment of fuel tube 32 wherein the fuel dispensing holes are located the following distances from the upstream end 32a: 'a' 0.275 inches; 'b' 0.475 inches; 'c' 0.725 inches; 'd' 1.075 inches; 'e' 1.375 inches; 'f' 0.375 inches; 'g' 0.575 inches; 'h' 0.875 inches; 'i' 1.175 inches; and 'j' 1.275 inches. It is understood that the radially inward flow of air through the radial swirler mixes with the fuel dispensed from the fuel dispensing holes 43 within the swirler 33. A majority of the premixing of fuel and air is done within the confines of the radial swirler 33. Further, it is understood by those skilled in the art that the changing of the location/orientation of the fuel dispensing holes 43 along the fuel tube 32 changes the fuel concentration profile at the outlet of the module 24.

Referring to FIGS. 7 and 8, there is illustrated the radial swirler 33 having a plurality of vanes 41 and showing the corresponding relationship to fuel tubes 32. In the preferred embodiment radial swirler 33 includes sixteen flat solid vanes 41 that are spaced equally around the circumference of the swirler and connected between two end plates 44. The vanes are joined to the end plates 44 by commonly known assembly techniques such as brazing or cast as one piece. The vanes 41 being preferably inclined at an angle $\phi$, wherein angle $\phi$ is most preferred to be about 42.5 degrees. It is understood that other angles are contemplated by the present invention, however it is understood that the degree of swirl is linked to the angle $\phi$ and swirling of the fluid impacts the mixing and production of oxides of nitrogen.

The fuel tubes 32 include fuel dispensing holes that are aligned in two rows and located on the radially inward side of the tubes. The fuel dispensing holes being located one hundred and twenty degrees apart, and oriented such that they are positioned sixty degrees fore and aft a radius 'R' that extends from the center of the radial swirler to the fuel tube 32. It is understood that other angles are contemplated, however the angle of inclination of the fuel dispensing holes 43 affects the fuel and air mixing during premixing.

Figure 9:
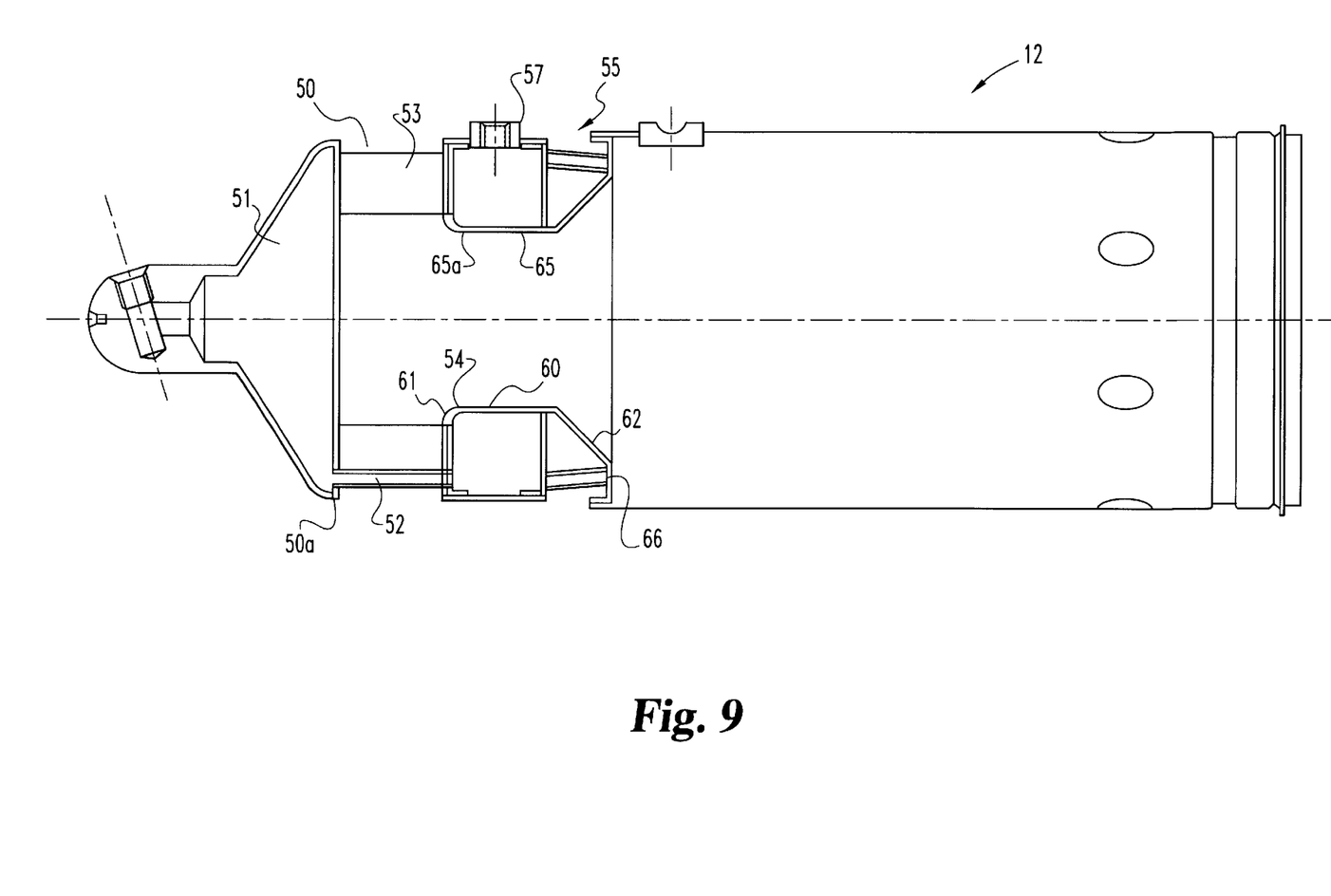
FIG. 9 is an illustrative side elevational view of one form of the FIG. 1 combustor with lean premix module.

With reference to FIG. 9, there is illustrated another form of a premix module for use with an inline can-annular combustor 12. The lean premix module 50 is substantially identical to the premix module 24 that was described for use in a silo combustor, however premix module 50 is intended for use in an inline engine. Any significant differences between the modules are highlighted in the description of the preferred form of premix module 50. The lean premix module 50 includes a primary fuel manifold 51, a plurality of fuel tubes 52, a radial swirler 53, a nozzle 54 and a pilot fuel system 55. Premix module 50 utilizes a dual mode fuel delivery technique to meet pollutant emission requirements and engine operability requirements. The modes of combustion related to this dual fuel delivery technique are generally referred to as premixed combustion, and pilot diffusion combustion. Premixed combustion techniques mix the fuel and air prior to delivery into the primary combustion zone within the combustor. During the pilot diffusion combustion mode fuel is directly injected into the primary combustion zone by the pilot fuel system 55. The pilot combustion mode operates under a conventional diffusion flame technology that is well known to those skilled in the art.

Figure 10:
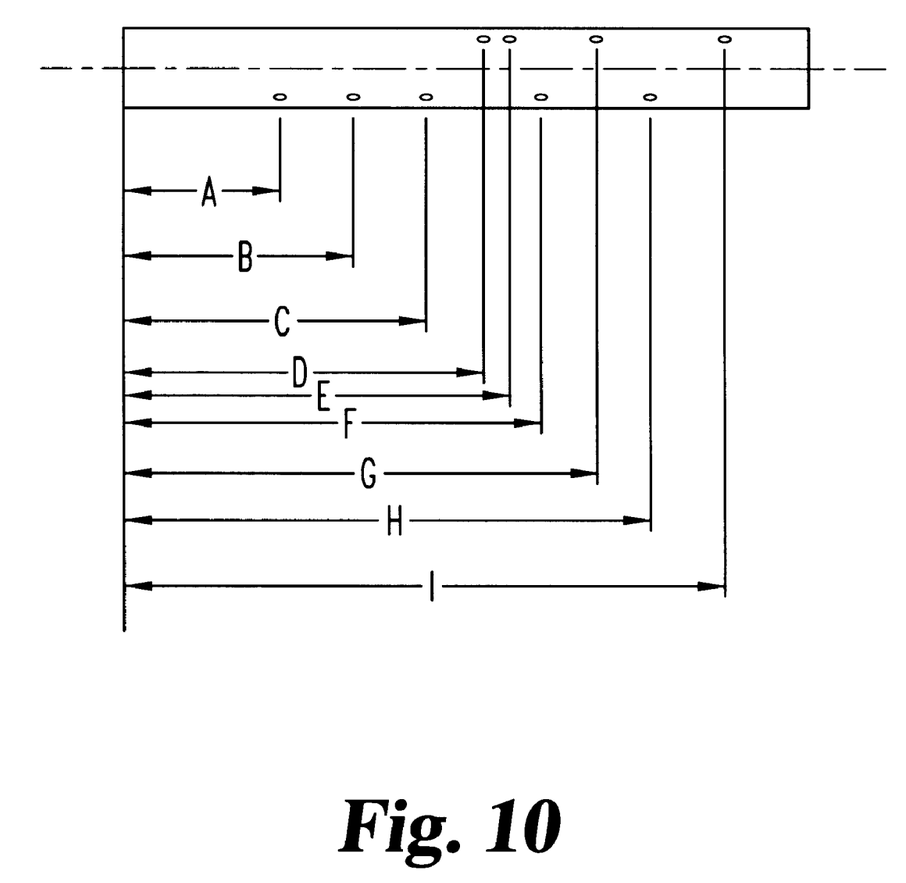
FIG. 10 is a side elevational view of one form of the fuel tube comprising a portion of the FIG. 9 lean premix module.

The primary fuel manifold 51 is connected to the upstream end 50a of the premix module 50 and provides fuel to the fuel tubes 52. Fuel tubes 52 extend axially along the radial swirler 53, and the fuel tubes 52 and radial swirler 53 are substantially similar to the fuel tubes 32 and swirler 33 of module 24. However, with reference to FIG. 10, there is illustrated the location of the fuel dispensing holes 56 that create the fuel concentration profile across the primary combustion zone. The fuel tubes 52 have an outside diameter of 3/16 inches and include nine 0.025 inch diameter fuel dispensing holes located-a distance as follows from the upstream end: 'A' 0.425 inches; 'B' 0.625 inches; 'C' 0.825 inches; 'D' 0.975 inches; 'E' 1.050 inches; 'F' 1.125 inches; 'G' 1.275 inches; 'H' 1.425 inches; and 'I' 1.625 inches. The fuel tubes 52 being oriented relative to the vanes of the fixed radial swirler 53 analogously to the vanes 41 of radial swirler 33 (FIGS. 7 and 8). Further the mixing of the air and fuel is accomplished in the inter-vane spacing as well as in the straight section 65a of the throat 65.

A pilot fuel manifold 57 is located in the trough between the fixed radial swirler 53 and the diverging section of the nozzle 60. The nozzle 60 includes a converging section 61 and a diverging section 62 that are separated by the throat 65. The functions of these sections are the same as for nozzle 36, however the nozzle 60 is connected directly to swirler 53 and there is an ellipsoidal transition from the swirler to the nozzle throat 65. The smooth ellipsoidal transition prevents any flow recirculation at sharp corners and minimizes or eliminates pressure drops across the transition. As can be seen from FIG. 9, the diameter of the throat 65 is about 50% of the diameter of the upstream end of the barrel of combustor 12 and about 80% of the diameter of the diverging section 62 of the nozzle 60 at the exit of the premix module 50. In one form of the nozzle 60 the surface 65a of the throat is covered with a thick thermal barrier ceramic coating.

The diverging section 62 of the nozzle includes a seventy degree included angle, and thereafter the flow of fuel and air undergoes a sudden expansion to the diameter of the combustor liner. This sudden expansion creates a sheltered annular zone 65 into which the pilot fuel is introduced through the twelve pilot tubes 66. The pilot tubes 66 being oriented at an acute angle to the liner wall and being spaced equally around the circumference of the module. A downstream surface 66 of the module 50 which is exposed to the hot gases in the sheltered annular zone 65 are air cooled by the passing of air through about two hundred and fifty effusion cooling holes that are laser drilled at a thirty degree angle to surface 66.

Figure 11:
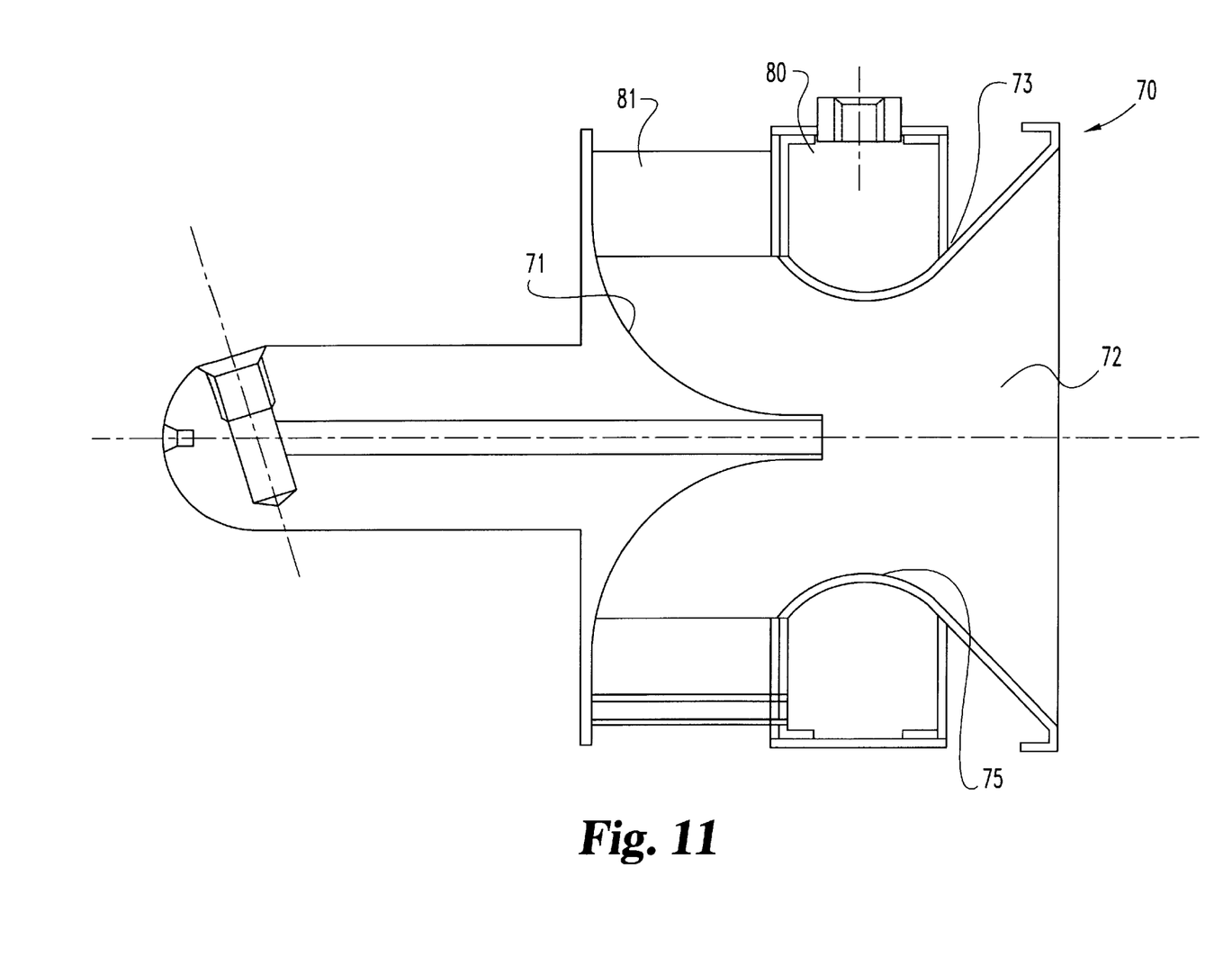
FIG. 11 is an illustrative side elevational view of another form of the lean premix module comprising a portion of the FIG. 1 combustor.

Referring to FIG. 11, there is illustrated another form of a lean premix module that is substantially identical to lean premix module 50. A significant difference is being attributed to the location of the pilot fuel system. Lean premix module 70 includes a central fuel pilot 71 that supplies fuel to the central recirculation zone 72 for providing stability during operation in the lean premix mode. The lean premix module 70 includes a nozzle 73 having a converging and diverging section with a throat 75 therebetween. The diverging section forms an included angle of 70 degrees and expands out further than in module 50, because the center fuel pilot 71 eliminates the necessity of having a sheltered region for receiving pilot fuel. As shown in FIG. 11, the diameter of the throat 75 is about 50% of the diameter of the diverging portion of the nozzle 73 adjacent the exit of the premix module. The main fuel manifold 80 being positioned in the trough between the fixed radial swirler 81 and the nozzle 73.

Figure 12:
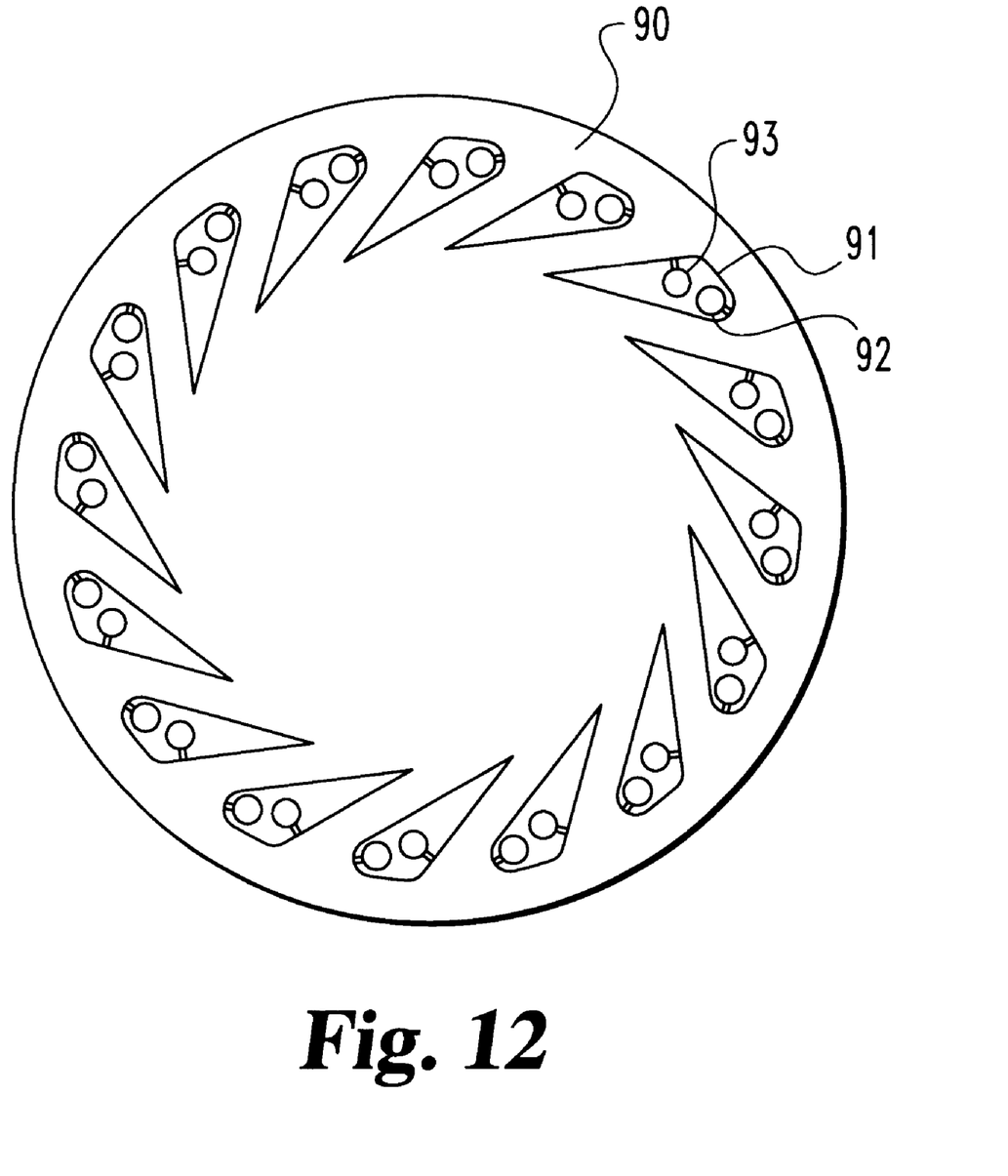
FIG. 12 is an end view of a radial swirler with swirler vanes having integral fuel passages comprising a portion of a lean premix module of the present invention.

With reference to FIG. 12, there is illustrated a radial swirler 90 having a plurality of vanes 91 with integral cylindrical fuel passages 92 and 93. The fixed radial swirler 90 being adapted for use in the previously described lean premix modules. The sixteen vanes 91 are of a triangular cross section and the air flows between the parallel sides of the adjacent vanes. The two fuel passages 92 and 93 allow for the dispensing of fuel on either side of the vane into the moving air. Further, the fuel distribution apertures are spaced axially along the vanes in order to control the dispensing of fuel and the corresponding fuel concentration profile. In one alternative embodiment of the present invention the fuel dispensing passages 92 and 93 are connected to separate fuel manifolds, which allows the fuel distribution from each passage to be controlled during operation.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A gas turbine engine, including:
   a combustor having at least one substantially can shape combustion chamber;
   a plurality of lean premix modules associated with each of said at least one combustion chamber, each of said modules having a centerline defining an axial direction and comprising a radial inflow swirler having a plurality of vanes oriented to accelerate a flow through said vanes; and
   at least one fueling pathway positioned axially along said radial swirler, said at least one fueling pathway includes a plurality of dispensing apertures adapted to dispense a fuel axially along said swirler.

2. The gas turbine engine in claim 1, wherein said plurality of lean premix modules number between seven and twenty-five.

3. The gas turbine engine in claim 2, wherein said plurality of lean premix modules number about twenty.

4. The gas turbine engine in claim 1, wherein said swirler is fixed relative to said premix module.

5. The gas turbine engine in claim 1, wherein said swirler has a hollow core extending between the vanes and along a length of the radial inflow swirler, wherein said hollow core defines a volume substantially free of any mechanical structure.

6. The gas turbine engine of claim 1, wherein said at least one substantially can shape combustion chamber defines at least one substantially cylindrical combustion chamber.

7. The gas turbine engine of claim 1, wherein said at least one substantially can shape combustion chamber defines a plurality of substantially can shape combustion chambers.

8. A combustor assembly for receiving fuel from an external source and air from a compressor, comprising:
   a combustor having a dome, said combustor having a substantially can shape combustion chamber; and
   a plurality of lean premix modules positioned within said dome and in fluid communication with said substantially can shape combustion chamber, each of said modules having a centerline defining an axial direction, at least two of said centerlines not being coincident, each of said modules comprising:
   a radial inflow swirler fixed relative to said module and having an upstream end, an inlet, and a plurality of vanes oriented to accelerate a flow through said vanes; and
   a fueling pathway positioned axially along said radial swirler for delivering fuel across said swirler, said fueling pathway having a plurality of fuel passages located substantially at said inlet of said swirler for dispensing fuel axially along a length of said swirler inlet.

9. The combustor assembly in claim 8, wherein said plurality of fuel passages having fuel dispensing holes positioned generally radially inward and distributed axially along said fuel passages.

10. The combustor assembly in claim 9, wherein each of said fuel passages has a fore array of fuel dispensing holes having a positive angular orientation with respect to an upstream axial direction and measured from a line extending from said fuel passage to said centerline of said swirler and an aft array of fuel dispensing holes having a negative angular orientation with respect to the upstream axial direction and measured from said line.

11. The combustor assembly in claim 10, wherein said positive angular orientation is about 60° and said negative angular orientation is about 60°.

12. The combustor assembly in claim 8, wherein each of said vanes of said swirler has a leading edge and is inclined about 40° to a line extending from said leading edge of said vane to said centerline of said swirler.

13. The combustor assembly in claim 8, wherein said vanes of said radial swirler are flat and solid.

14. The combustor assembly in claim 8, wherein said substantially can shape combustion chamber defines a substantially cylindrical combustion chamber.

15. The combustor assembly in claim 8, wherein said combustor including a plurality of substantially can shape combustion chambers, and wherein each of said plurality of substantially can shape combustion chambers has a plurality of said lean premix modules in fluid communication therewith.

16. A combustor assembly for receiving fuel from an external source and air from a compressor, comprising:
a combustion housing having an upstream end; and
a lean premix module connected to said upstream end of said combustion housing, said module having a centerline defining an axial direction and comprising:
a radial inflow swirler fixed relative to said module and having an upstream end, an inlet, an outlet, and a plurality of vanes defining a plurality of flow channels therebetween, at least one of said channels having a varying cross-sectional width, said radial inflow swirler utilizing said plurality of vanes to swirl the fuel and air in one direction, each of said plurality of vanes has a trailing edge, and wherein said swirler defining between said trailing edges a hollow core extending substantially an entire axial length of said swirler and an entire radial length between said trailing edges; and
a fueling pathway positioned axially along said swirler for delivering fuel across said swirler, said fueling pathway having an outlet located upstream of said outlet of said swirler.

17. The combustor assembly in claim 16, wherein said fueling pathway includes a plurality of fuel passages, each of said fuel passages having a downstream side and fuel dispensing holes located on said downstream side and distributed axially along said fuel passages.

18. The combustor assembly in claim 17, wherein each of said fuel passages has a fore array of fuel dispensing holes having a positive angular orientation with respect to an upstream axial direction and measured from a line extending from said fuel passage to said centerline of said swirler and an aft array of fuel dispensing holes having a negative angular orientation with respect to the upstream axial direction and measured from said line.

19. The combustor assembly in claim 18, wherein each of said fuel passages has an axial midpoint; said fuel dispensing holes of said aft array are distributed substantially uniformly along each of said fuel passages; and said fuel dispensing holes of said fore array are distributed primarily downstream of said axial midpoint of each of said fuel passages.

20. The combustor assembly in claim 18, wherein said positive angular orientation is located about 60° and said negative angular orientation is located about 60°.

21. The combustor assembly in claim 16, wherein each of said vanes of said swirler has a leading edge and is inclined about 40° to a line extending from said leading edge of said vane to said centerline of said swirler.

22. The combustor assembly in claim 16, wherein said vanes of said radial swirler are flat and solid.

23. A combustor assembly for receiving fuel from an external source and air from a compressor, comprising:
a combustor having a dome; and
a plurality of lean premix modules positioned within said dome, each of said modules having a centerline defining an axial direction and having a radial inflow swirler including a plurality of vanes with a swirler vane passageway between adjacent vanes that accelerates said fuel and said air, each of said plurality of vanes has a trailing edge, and wherein said swirler defining between diametrically opposed of said trailing edges a hollow core extending substantially an entire axial length of said swirler; and
a plurality of fueling passageways positioned axially along said radial inflow swirler, and each of said swirler vane passageways has a corresponding one of said plurality of fueling passageways adapted to dispense fuel therein.

24. The combustor assembly in claim 23, wherein each of said lean premix modules further comprises a nozzle downstream of and in flow communication with said radial swirler, said nozzle having a converging section for accelerating the flow of mixed fuel and air to inhibit flashback into said module, and said nozzle having a diverging section downstream from said converging section for expanding the flow of fuel and air.

25. The combustor assembly in claim 24, wherein said converging section has an included angle of about 60°.

26. The combustor assembly in claim 24, wherein said diverging section has an included angle of about 70°.

27. A combustor assembly for receiving fuel from an external source and air from a compressor, comprising:
a combustion housing having an upstream end; and
a premix module connected to said upstream end of said combustion housing, said module having a centerline defining an axial direction and having a radial inflow swirler including a plurality of vanes with a fluid flow passageway between adjacent vanes adapted to accelerate the fuel and air, each of said vanes has a trailing edge, and wherein said swirler defining between diametrically opposed of said trailing edges a hollow core extending substantially an entire axial length of said swirler; and
a fueling pathway positioned axially along said radial inflow swirler, said pathway includes a plurality of dispensing holes adapted to dispense fuel therein along said swirler.

28. The combustor assembly in claim 27, wherein said lean premix module further comprises a nozzle downstream of and in flow communication with said radial swirler, said nozzle having a converging section for accelerating the flow of mixed fuel and air to inhibit flashback into said module, and said nozzle having a diverging section downstream from said converging section for expanding the flow of fuel and air.

29. The combustor assembly in claim 28, wherein said diverging section has an included angle of about 70°.

30. A combustor assembly for receiving a flow of fuel from an external source and a flow of air from a compressor, comprising:

a combustor having a dome, said combustor having a substantially can shape combustion chamber; and a plurality of premix modules positioned within said dome and in flow communication with said substantially can shape combustion chamber, each of said modules having a centerline defining an axial direction and comprising:

a radial inflow swirler having a inlet, an outlet, a downstream end, and a plurality of vanes with fluid flow passageways between said vanes, each of said plurality of vanes having a trailing edge;

a plurality of fueling passageways extending axially along said radial inflow swirler, and each of said fluid flow passageways has at least one of said plurality of fueling passageways adapted to dispense fuel therein; and a premixing chamber connected to said downstream end of said radial swirler, said premising chamber having a substantially cylindrical shape with a diameter that is substantially the same as a distance between said trailing edges of diametrically opposed said vanes.

31. The combustor assembly in claim 30, wherein said radial swirler is fixed relative to said premix module.

32. The combustor assembly in claim 31, wherein each of said premix modules further includes a plurality of fuel tubes extending axially along said radial swirler and located adjacent said inlet of said swirler, each of said fuel tubes having an outlet.

33. The combustor assembly in claim 32, wherein each of said fuel tubes further includes a radially inward side; and said outlet of each of said fuel tubes further comprises a plurality of fuel holes located on said radially inward side of said fuel tube.

34. The combustor assembly in claim 30, wherein each of said premix modules further comprises a nozzle positioned downstream of and in flow communication with said premixing chamber, said nozzle having a converging section and a diverging section located downstream of said converging section.

35. The combustor assembly in claim 34, wherein said converging section has an included angle of about 60°.

36. The combustor assembly in claim 34, wherein said diverging section has an included angle of about 70°.

37. The combustor assembly of claim 30, wherein said substantially can shape combustion chamber defines a substantially cylindrical combustion chamber.

* * * * *

UNITED STATES PATENT AND TRADEMARK OFFICE
CERTIFICATE OF CORRECTION

PATENT NO. : 6,094,916  
DATED : August 1, 2000  
INVENTOR(S) : Rahul Puri, Mohan K. Razdan, Duane A. Smith and David M. Stansel Page 1 of 1

It is certified that error appears in the above-identified patent and that said Letters Patent is hereby corrected as shown below:

Column 7,
Line 56, please change "use-in" to -- use in. --

Column 11,
Line 18, please change "premising" to -- premixing. --

Title page, item [54],
In the title, please change "Dry Low Oxides of Nitrogen Lean Premix Module for Industrial Gas Turbine Engines" to -- A Lean Premix Module Including a Radial Inflow Swirler for a Gas Turbine Engine. --

Signed and Sealed this

Sixteenth Day of October, 2001

Attest:

NICHOLAS P. GODICI  
Attesting Officer    Acting Director of the United States Patent and Trademark Office